(12) United States Patent
Kamath et al.

(10) Patent No.: US 8,750,129 B2
(45) Date of Patent: Jun. 10, 2014

(54) CREDIT-BASED NETWORK CONGESTION MANAGEMENT

(75) Inventors: Dayavanti G. Kamath, Santa Clara, CA (US); Keshav Kamble, Fremont, CA (US); Deepak Kumar, Santa Clara, CA (US); Dar-ren Leu, San Jose, CA (US); Vijoy Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 13/267,578

(22) Filed: Oct. 6, 2011

(65) Prior Publication Data

US 2013/0088959 A1 Apr. 11, 2013

(51) Int. Cl.
*H04W 4/00* (2009.01)
*H04L 12/56* (2006.01)

(52) U.S. Cl.
CPC ............ *H04L 47/35* (2013.01); *H04L 47/2458* (2013.01)
USPC .......................................... 370/238; 370/235

(58) Field of Classification Search
CPC ......... H04L 47/10; H04L 47/35; H04L 47/30; H04L 47/127; H04L 47/2458
USPC .............. 370/235, 235.1, 236, 397, 399, 400, 370/401, 422
See application file for complete search history.

(56) References Cited

U.S. PATENT DOCUMENTS

| | | | |
|---|---|---|---|
| 5,394,402 A | 2/1995 | Ross | |
| 5,515,359 A | 5/1996 | Zheng | |
| 5,617,421 A | 4/1997 | Chin et al. | |
| 5,633,859 A | 5/1997 | Jain et al. | |
| 5,633,861 A | 5/1997 | Hanson et al. | |
| 5,742,604 A | 4/1998 | Edsall et al. | |
| 5,893,320 A | 4/1999 | Demaree | |
| 6,147,970 A * | 11/2000 | Troxel | ............................ 370/235 |

(Continued)

FOREIGN PATENT DOCUMENTS

| | | |
|---|---|---|
| CN | 1897567 | 1/2007 |
| CN | 101030959 A | 9/2007 |

(Continued)

OTHER PUBLICATIONS

Schlansker et al.,"High-Performance Ethernet-Based Communications for Future Multi-Core Processors", Proceedings of the 2007 ACM/IEEE conference on Supercomputing, Nov. 10-16, 2007.

(Continued)

*Primary Examiner* — Brian O'Connor
(74) *Attorney, Agent, or Firm* — Yudell Isidore Ng Russell PLLC

(57) ABSTRACT

A switching network includes first, second and third switches coupled for communication, such that the first and third switches communicate data traffic via the second switch. The first switch is operable to request transmission credits from the third switch, receive the transmission credits from the third switch and perform transmission of data traffic in reference to the transmission credits. The third switch is operable to receive the request for transmission credits from the first switch, generate the transmission credits and transmit the transmission credits to the first switch via the second switch. The second switch is operable to modify the transmission credits transmitted by the third switch prior to receipt of the transmission credits at the first switch.

18 Claims, 7 Drawing Sheets

(56) References Cited

U.S. PATENT DOCUMENTS

| | | | |
|---|---|---|---|
| 6,304,901 B1 | 10/2001 | McCloghrie et al. | |
| 6,347,337 B1 | 2/2002 | Shah et al. | |
| 6,567,403 B1 | 5/2003 | Congdon et al. | |
| 6,646,985 B1 | 11/2003 | Park et al. | |
| 6,839,768 B2 | 1/2005 | Ma et al. | |
| 6,901,452 B1 | 5/2005 | Bertagna | |
| 7,035,220 B1* | 4/2006 | Simcoe | 370/236 |
| 7,263,060 B1 | 8/2007 | Garofalo et al. | |
| 7,508,763 B2* | 3/2009 | Lee | 370/235 |
| 7,561,517 B2 | 7/2009 | Klinker et al. | |
| 7,593,320 B1 | 9/2009 | Cohen et al. | |
| 7,668,966 B2 | 2/2010 | Klinker et al. | |
| 7,830,793 B2 | 11/2010 | Gai et al. | |
| 7,839,777 B2 | 11/2010 | DeCusatis et al. | |
| 7,848,226 B2 | 12/2010 | Morita | |
| 7,912,003 B2* | 3/2011 | Radunovic et al. | 370/329 |
| 7,974,223 B2 | 7/2011 | Zelig et al. | |
| 8,085,657 B2* | 12/2011 | Legg | 370/229 |
| 8,139,358 B2 | 3/2012 | Tambe | |
| 8,194,534 B2 | 6/2012 | Pandey et al. | |
| 8,213,429 B2 | 7/2012 | Wray et al. | |
| 8,265,075 B2 | 9/2012 | Pandey | |
| 8,271,680 B2 | 9/2012 | Salkewicz | |
| 8,325,598 B2 | 12/2012 | Krzanowski | |
| 8,345,697 B2* | 1/2013 | Kotha et al. | 370/401 |
| 8,406,128 B1 | 3/2013 | Brar et al. | |
| 8,498,284 B2* | 7/2013 | Pani et al. | 370/346 |
| 8,498,299 B2* | 7/2013 | Katz et al. | 370/400 |
| 8,625,427 B1* | 1/2014 | Terry et al. | 370/235 |
| 2002/0191628 A1 | 12/2002 | Liu et al. | |
| 2003/0185206 A1 | 10/2003 | Jayakrishnan | |
| 2004/0088451 A1 | 5/2004 | Han | |
| 2004/0243663 A1 | 12/2004 | Johanson et al. | |
| 2004/0255288 A1 | 12/2004 | Hashimoto et al. | |
| 2005/0047334 A1 | 3/2005 | Paul et al. | |
| 2006/0029072 A1 | 2/2006 | Perera et al. | |
| 2006/0251067 A1 | 11/2006 | DeSanti et al. | |
| 2007/0036178 A1 | 2/2007 | Hares et al. | |
| 2007/0263640 A1 | 11/2007 | Finn | |
| 2008/0205377 A1 | 8/2008 | Chao et al. | |
| 2008/0225712 A1 | 9/2008 | Lange | |
| 2008/0228897 A1 | 9/2008 | Ko | |
| 2009/0129385 A1 | 5/2009 | Wray et al. | |
| 2009/0185571 A1 | 7/2009 | Tallet | |
| 2009/0213869 A1 | 8/2009 | Rajendran et al. | |
| 2009/0252038 A1 | 10/2009 | Cafiero et al. | |
| 2010/0054129 A1 | 3/2010 | Kuik et al. | |
| 2010/0054260 A1 | 3/2010 | Pandey et al. | |
| 2010/0158024 A1 | 6/2010 | Sajassi et al. | |
| 2010/0183011 A1 | 7/2010 | Chao | |
| 2010/0223397 A1 | 9/2010 | Elzur | |
| 2010/0226368 A1 | 9/2010 | Mack-Crane et al. | |
| 2010/0246388 A1 | 9/2010 | Gupta et al. | |
| 2010/0257263 A1 | 10/2010 | Casado et al. | |
| 2010/0265824 A1 | 10/2010 | Chao et al. | |
| 2010/0303075 A1 | 12/2010 | Tripathi et al. | |
| 2011/0007746 A1 | 1/2011 | Mudigonda et al. | |
| 2011/0019678 A1 | 1/2011 | Mehta et al. | |
| 2011/0026403 A1 | 2/2011 | Shao et al. | |
| 2011/0026527 A1 | 2/2011 | Shao et al. | |
| 2011/0032944 A1 | 2/2011 | Elzur et al. | |
| 2011/0035494 A1 | 2/2011 | Pandey et al. | |
| 2011/0103389 A1 | 5/2011 | Kidambi et al. | |
| 2011/0134793 A1 | 6/2011 | Elsen et al. | |
| 2011/0235523 A1 | 9/2011 | Jha et al. | |
| 2011/0280572 A1 | 11/2011 | Vobbilisetty et al. | |
| 2011/0299406 A1 | 12/2011 | Vobbilisetty et al. | |
| 2011/0299409 A1 | 12/2011 | Vobbilisetty et al. | |
| 2011/0299532 A1 | 12/2011 | Yu et al. | |
| 2011/0299536 A1 | 12/2011 | Cheng et al. | |
| 2012/0014261 A1 | 1/2012 | Salam et al. | |
| 2012/0014387 A1 | 1/2012 | Dunbar et al. | |
| 2012/0033541 A1 | 2/2012 | Jacob Da Silva et al. | |
| 2012/0131662 A1 | 5/2012 | Kuik et al. | |
| 2012/0177045 A1 | 7/2012 | Berman | |
| 2012/0228780 A1 | 9/2012 | Kim et al. | |
| 2012/0243539 A1 | 9/2012 | Keesara | |
| 2012/0243544 A1 | 9/2012 | Keesara | |
| 2012/0287786 A1 | 11/2012 | Kamble et al. | |
| 2012/0287787 A1 | 11/2012 | Kamble et al. | |
| 2012/0287939 A1 | 11/2012 | Leu et al. | |
| 2012/0320749 A1 | 12/2012 | Kamble et al. | |
| 2013/0022050 A1 | 1/2013 | Leu et al. | |
| 2013/0051235 A1* | 2/2013 | Song et al. | 370/235 |
| 2013/0064067 A1 | 3/2013 | Kamath et al. | |
| 2013/0064068 A1 | 3/2013 | Kamath et al. | |

FOREIGN PATENT DOCUMENTS

| | | |
|---|---|---|
| CN | 101087238 | 12/2007 |
| EP | 0853405 | 7/1998 |
| EP | 0853405 A3 | 9/1998 |

OTHER PUBLICATIONS

Yoshigoe et al., "RATE Control for Bandwidth Allocated Services in IEEE 802.3 Ethernet", Proceedings of the 26th Annual IEEE Conference on Local Computer Networks, Nov. 14-16 2001.

Tolmie, "HIPPI-6400—Designing for speed", 12th Annual International Symposium on High Performance Computing Systems and Applications (HPCSt98), May 20-22, 1998.

U.S. Appl. No. 13/107894, Non-Final Office Action Dated Jun. 20, 2013.

U.S. Appl. No. 13/594970, Final Office Action Dated Sep. 25, 2013

U.S. Appl. No. 13/594970, Non-Final Office Action Dated May 29, 2013.

U.S. Appl. No. 13/107397, Final Office Action Dated May 29, 2013.

U.S. Appl. No. 13/107397, Non-Final Office Action Dated Jan. 4, 2013.

U.S. Appl. No. 13/466754, Non-Final Office Action Dated Sep. 25, 2013.

U.S. Appl. No. 13/229867, Non-Final Office Action Dated May 24, 2013.

U.S. Appl. No. 13/595047, Non-Final Office Action Dated May 24, 2013.

U.S. Appl. No. 13/107985, Notice of Allowance Dated Jul. 18, 2013.

U.S. Appl. No. 13/107985, Non-Final Office Action Dated Feb. 28, 2013.

U.S. Appl. No. 13/107433, Final Office Action Dated Jul. 10, 2013.

U.S. Appl. No. 13/107433 Non-Final Office Action Dated Jan. 28, 2013.

U.S. Appl. No. 13/466790, Final Office Action Dated Jul. 12, 2013.

U.S. Appl. No. 13/466790, Non-Final Office Action Dated Feb. 15, 2013.

U.S. Appl. No. 13/107554, Final Office Action Dated Jul. 3, 2013.

U.S. Appl. No. 13/107554, Non-Final Office Action Dated Jan. 8, 2013.

U.S. Appl. No. 13/229891, Non-Final Office Action Dated May 9, 2013.

U.S. Appl. No. 13/595405, Non-Final Office Action Dated May 9, 2013.

U.S. Appl. No. 13/107896, Notice of Allowance Dated Jul. 29, 2013.

U.S. Appl. No. 13/107896, Non-Final Office Action Dated Mar. 7, 2013.

U.S. Appl. No. 13/267459, Non-Final Office Action Dated May 2, 2013.

U.S. Appl. No. 13/267578, Non-Final Office Action Dated Aug. 6, 2013.

U.S. Appl. No. 13/267578, Non-Final Office Action Dated Apr. 5, 2013.

U.S. Appl. No. 13/314455, final Office Action Dated Aug. 30, 2013.

U.S. Appl. No. 13/314455, Non-Final Office Action Dated Apr. 24, 2013.

Martin, et al., "Accuracy and Dynamics of Multi-Stage Load Balancing for Multipath Internet Routing", Institute of Computer Science, Univ. Of Wurzburg Am Hubland, Germany, IEEE Int'l Conference on Communications (ICC) Glasgow, UK, pp. 1-8, Jun. 2007.

(56) References Cited

OTHER PUBLICATIONS

Kinds, et al., "Advanced Network Monitoring Brings Life to the Awareness Plane", IBM Research Spyros Denazis, Univ. Of Patras Benoit Claise, Cisco Systems, IEEE Communications Magazine, pp. 1-7, Oct. 2008.
Kandula, et al., "Dynamic Load Balancing Without Packet Reordering", ACM SIGCOMM Computer Communication Review, vol. 37, No. 2, pp. 53-62, Apr. 2007.
Vazhkudai, et al., "Enabling the Co-Allocation of Grid Data Transfers", Department of Computer and Information Sciences, The Univ. Of Mississippi, pp. 44-51, Nov. 17, 2003.
Xiao, et al. "Internet QoS: A Big Picture", Michigan State University, IEEE Network, pp. 8-18, Mar/Apr 1999.
Jo et al., "Internet Traffic Load Balancing using Dynamic Hashing with Flow Volume", Conference Title: Internet Performance and Control of Network Systems III, Boston, MA pp. 1-12, Jul. 30, 2002.
Schueler et al., "TCP-Splitter: A TCP/IP Flow Monitor in Reconfigurable Hardware", Appl. Res. Lab., Washington Univ. pp. 54-59, Feb. 19, 2003.
Yemini et al., "Towards Programmable Networks"; Dept. of Computer Science Columbia University, pp. 1-11, Apr. 15, 1996.
Soule, et al., "Traffic Matrices: Balancing Measurements, Interference and Modeling", vol. 33, Issue: 1, Publisher: ACM, pp. 362-373, Year 2005.
De-Leon, "Flow Control for Gigabit", Digital Equipment Corporation (Digital), IEEE 802.3z Task Force, Jul. 9, 1996.
Schlansker, et al., "High-Performance Ethernet-Based Communications for Future Multi-Core Processors", Proceedings of the 2007 ACM/IEEE conference on Supercomputing, Nov. 10-16, 2007.
Yoshigoe, et al., "Rate Control for Bandwidth Allocated Services in IEEE 802.3 Ethernet", Proceedings of the 26th Annual IEEE Conference on Local Computer Networks, Nov. 14-16, 2001.
Tolmie, "HIPPI-6400—Designing for speed", 12th Annual Int'l Symposium on High Performance Computing Systems and Applications (HPCSt98), May 20-22, 1998.
Manral, et al., "Rbridges: Bidirectional Forwarding Detection (BFD) support for TRILL draft-manral-trill-bfd-encaps-01", pp. 1-10, TRILL Working Group Internet-Draft, Mar. 13, 2011.
Perlman, et al., "Rbridges: Base Protocol Specification", pp. 1-117, TRILL Working Group Internet-Draft, Mar. 3, 2010.
D.E. Eastlake, "Rbridges and the IETF TRILL Protocol", pp. 1-39, TRILL Protocol, Dec. 2009.
Leu, Dar-Ren, "dLAG-DMLT over TRILL", BLADE Network Technologies, pp. 1-20, Copyright 2009.
Posted by Mike Fratto, "Cisco's FabricPath and IETF TRILL: Cisco Can't Have Standards Both Ways", Dec. 17, 2010; http://www.networkcomputing.com/data-networking-management/229500205.
Cisco Systems Inc., "Cisco FabricPath Overview", pp. 1-20, Copyright 2009.
Brocade, "BCEFE in a Nutshell First Edition", Global Education Services Rev. 0111, pp. 1-70, Copyright 2011, Brocade Communications Systems, Inc.
Pettit et al., Virtual Switching in an Era of Advanced Edges, pp. 1-7, Nicira Networks, Palo Alto, California. Version date Jul. 2010.
Pfaff et al., Extending Networking into the Virtualization Layer, pp. 1-6, Oct. 2009, Proceedings of the 8th ACM Workshop on Hot Topics in Networks (HotNets-VIII), New York City, New York.
Sherwood et al., FlowVisor: A Network Virtualization Layer, pp. 1-14, Oct. 14, 2009, Deutsche Telekom Inc. R&D Lab, Stanford University, Nicira Networks.
Yan et al., Tesseract: A 4D Network Control Plane, pp. 1-15, NSDI'07 Proceedings of the 4th USENIX conference on Networked systems design & implementation USENIX Association Berkeley, CA, USA 2007.
Hunter et al., BladeCenter, IBM Journal of Research and Development, vol. 49, No. 6, p. 905. Nov. 2005.
VMware, Inc., "VMware Virtual Networking Concepts", pp. 1-12, Latest Revision: Jul. 29, 2007.
Perla, "Profiling User Activities on Guest OSes in a Virtual Machine Environment." (2008).
Shi et al., Architectural Support for High Speed Protection of Memory Integrity and Confidentiality in Multiprocessor Systems, pp. 1-12, Proceedings of the 13th International Conference on Parallel Architecture and Compilation Techniques (2004).
Guha et al., ShutUp: End-to-End Containment of Unwanted Traffic, pp. 1-14, (2008).
Recio et al., Automated Ethernet Virtual Bridging, pp. 1-11, IBM 2009.
Sproull et al., "Control and Configuration Software for a Reconfigurable Networking Hardware Platform", Applied Research Laboratory, Washington University, Saint Louis, MO 63130; pp. 1-10 (or 45-54)—Issue Date: 2002, Date of Current Version: Jan. 6, 2003.
Papadopoulos et al.,"NPACI Rocks: Tools and Techniques for Easily Deploying Manageable Linux Clusters", The San Diego Supercomputer Center, University of California San Diego, La Jolla, CA 92093-0505—Issue Date: 2001, Date of Current Version: Aug. 7, 2002.
Ruth et al., Virtual Distributed Environments in a Shared Infrastructure, pp. 63-69, IEEE Computer Society, May 2005.
"Rouiller, Virtual Lan Security: weaknesses and countermeasures, pp. 1-49, GIAC Security Essentials Practical Assignment Version 1.4b" Dec. 2003.
Walters et al., An Adaptive Heterogeneous Software DSM, pp. 1-8, Columbus, Ohio, Aug. 14-Aug. 18.
Skyrme et al., Exploring Lua for Concurrent Programming, pp. 3556-3572, Journal of Universal Computer Science, vol. 14, No. 21 (2008), submitted: Apr. 16, 2008, accepted: May 6, 2008, appeared: Jan. 12, 2008.
Dobre, Multi-Architecture Operating Systems, pp. 1-82, Oct. 4, 2004.
Int'l Searching Authority; Int. Appln. PCT/IB2012/051803; Int'l Search Report dated Sep. 13, 2012 (7 pg.).
U.S. Appl. No. 13/107893, Notice of Allowance Dated Jul. 10, 2013.
U.S. Appl. No. 13/107893, Non-Final Office Action Dated Apr. 1, 2013.
U.S. Appl. No. 13/472964, Notice of Allowance Dated Jul. 12, 2013.
U.S. Appl. No. 13/472964, Non-Final Office Action Dated Mar. 29, 2013.
U.S. Appl. No. 13/107903, Notice of Allowance Dated Sep. 11, 2013.
U.S. Appl. No. 13/107903, Final Office Action Dated Jul. 19, 2013.
U.S. Appl. No. 13/107903, Non-Final Office Action Dated Feb. 22, 2013.
U.S. Appl. No. 13/585446, Notice of Allowance Dated Sep. 12, 2013.
U.S. Appl. No. 13/585446, Final Office Action Dated Jul. 19, 2013.
U.S. Appl. No. 13/585446, Non-Final Office Action Dated Feb. 16, 2013.
U.S. Appl. No. 13/107554, Notice of Allowance Dated Oct. 18, 2013.
U.S. Appl. No. 13/267459, Final Office Action Dated Oct. 23, 2013.
U.S. Appl. No. 13/107894, Final Office Action Dated Nov. 1, 2013.
U.S. Appl. No. 13/594993, Non-Final Office Action Dated Oct. 25, 2013.

\* cited by examiner

CREDIT-BASED NETWORK CONGESTION MANAGEMENT

BACKGROUND OF THE INVENTION

1. Technical Field

The present disclosure relates in general to network communication and, in particular, to an improved congestion management system for packet switched networks.

2. Description of the Related Art

As is known in the art, network communication is commonly premised on the well known seven layer Open Systems Interconnection (OSI) model, which defines the functions of various protocol layers while not specifying the layer protocols themselves. The seven layers, sometimes referred to herein as Layer 7 through Layer 1, are the application, presentation, session, transport, network, data link, and physical layers, respectively.

At a source station, data communication begins when data is received from a source process at the top (application) layer of the stack of functions. The data is sequentially formatted at each successively lower layer of the stack until a data frame of bits is obtained at the data link layer. Finally, at the physical layer, the data is transmitted in the form of electromagnetic signals toward a destination station via a network link. When received at the destination station, the transmitted data is passed up a corresponding stack of functions in the reverse order in which the data was processed at the source station, thus supplying the information to a receiving process at the destination station.

The principle of layered protocols, such as those supported by the OSI model, is that, while data traverses the model layers vertically, the layers at the source and destination stations interact in a peer-to-peer (i.e., Layer N to Layer N) manner, and the functions of each individual layer are performed without affecting the interface between the function of the individual layer and the protocol layers immediately above and below it. To achieve this effect, each layer of the protocol stack in the source station typically adds information (in the form of an encapsulated header) to the data generated by the sending process as the data descends the stack. At the destination station, these encapsulated headers are stripped off one-by-one as the data propagates up the layers of the stack until the decapsulated data is delivered to the receiving process.

The physical network coupling the source and destination stations may include any number of network nodes interconnected by one or more wired or wireless network links. The network nodes commonly include hosts (e.g., server computers, client computers, mobile devices, etc.) that produce and consume network traffic, switches, and routers. Conventional network switches interconnect different network segments and process and forward data at the data link layer (Layer 2) of the OSI model. Switches typically provide at least basic bridge functions, including filtering data traffic by Layer 2 Media Access Control (MAC) address, learning the source MAC addresses of frames, and forwarding frames based upon destination MAC addresses. Routers, which interconnect different networks at the network (Layer 3) of the OSI model, typically implement network services such as route processing, path determination and path switching.

A large network typically includes a large number of switches, which operate somewhat independently. Switches within the flow path of network data traffic include an ingress switch that receives incoming data packets and an egress switch that sends outgoing data packets, and frequently further include one or more intermediate switches coupled between the ingress and egress switches. In such a network, a switch is said to be congested when the rate at which data traffic ingresses at the switch exceeds the rate at which data traffic egresses at the switch.

In conventional networks, when a switch in a data flow path is congested with data traffic, the congested switch may apply "back pressure" by transmitting one or more congestion management messages, such as a priority-based flow control (PFC) or congestion notification (CN) message, requesting other switches in the network that are transmitting data traffic to the congested switch to reduce or to halt data traffic to the congested switch. Conventional congestion management message may specify a backoff time period during which data traffic is reduced or halted, where the backoff time may be determined upon the extent of congestion experienced by the congested switch.

Conventional congestion management messages may not provide satisfactory management of network traffic, however. Conventional congestion management schemes are voluntary in that the switches sourcing the congesting data traffic are free to ignore the congestion management messages of the congested switch and to continue to transmit excess data traffic, which ultimately will be dropped by the congested switch. Further, a delay occurs between when congestion is detected by the congested switch and when the other switches of the network stop sending data traffic to the congested switch. During the delay, excess data traffic can be dropped by the congested switch. Thus, the conventional techniques of congestion management are reactionary and can require the communication protocols utilized to transport the data traffic to recover dropped data traffic. Conventional congestion management is particularly inadequate in scenarios in which the flow path of data traffic includes a large number of series-connected switches. In such cases, congestion may start at the egress switch and then continue to build toward the ingress switch in domino fashion, with data traffic being dropped all along the line. The processing and latency required to recover traffic dropped in response to congestion is further exacerbated when the data traffic is communicated with lossy lower layer protocols.

SUMMARY OF THE INVENTION

In at least one embodiment, a switching network includes first, second and third switches coupled for communication, such that the first and third switches communicate data traffic via the second switch. The first switch is operable to request transmission credits from the third switch, receive the transmission credits from the third switch and perform transmission of data traffic in reference to the transmission credits. The third switch is operable to receive the request for transmission credits from the first switch, generate the transmission credits and transmit the transmission credits to the first switch via the second switch. The second switch is operable to modify the transmission credits transmitted by the third switch prior to receipt of the transmission credits at the first switch.

DETAILED DESCRIPTION OF ILLUSTRATIVE EMBODIMENT

Figure 1:
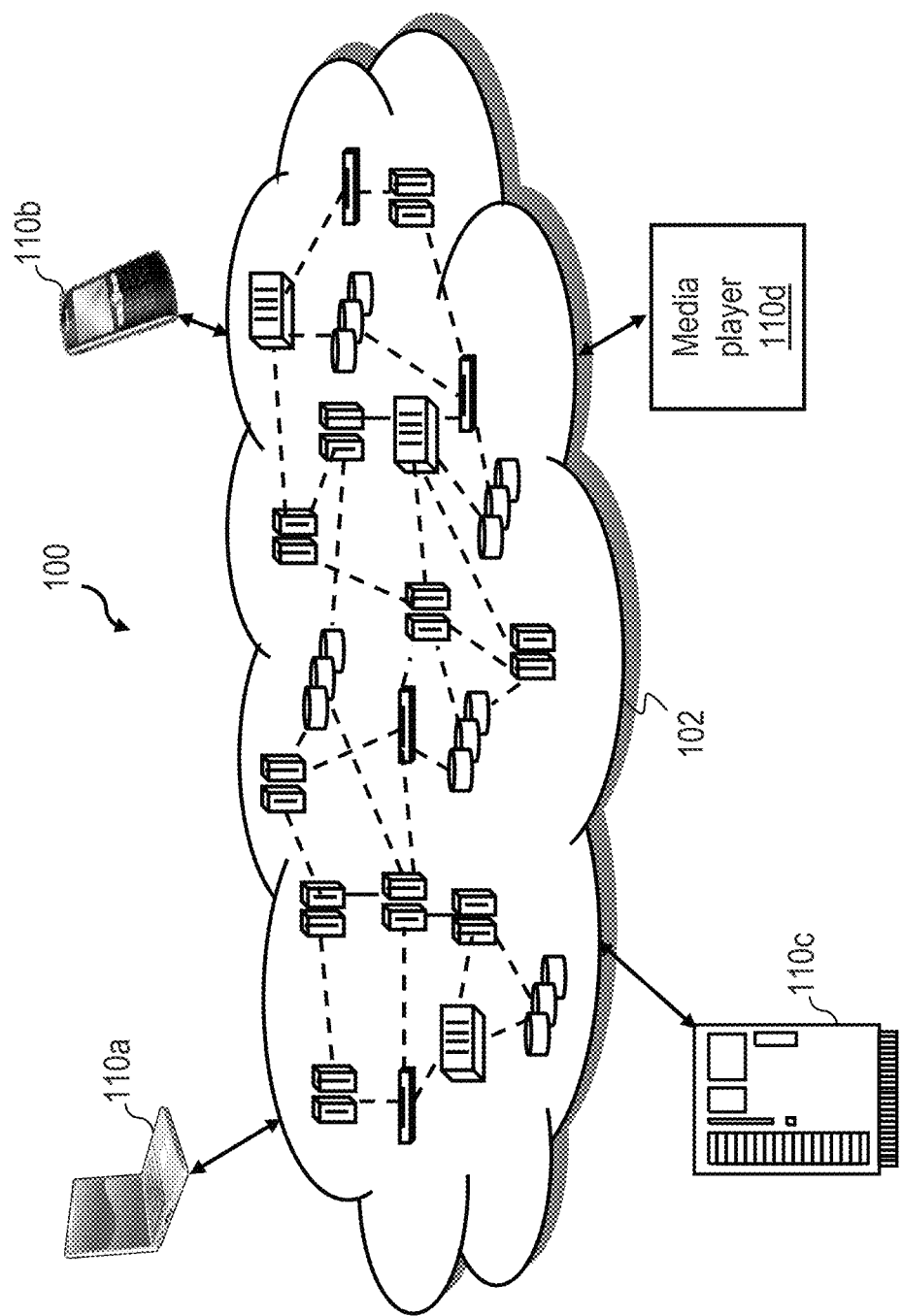
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100 includes a collection of resources 102. Resources 102, which may include various hosts, clients, switches, routers, storage, etc., are interconnected for communication and may be grouped (not shown) physically or virtually, in one or more public, private, community, public, or cloud networks or a combination thereof. In this manner, data processing environment 100 can offer infrastructure, platforms, software and/or services accessible to various client devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of client devices 110 shown in FIG. 1 are illustrative only and that client devices 110 can be any type of electronic device capable of communicating with and/or accessing resources 102 via a packet network.

Figure 2:
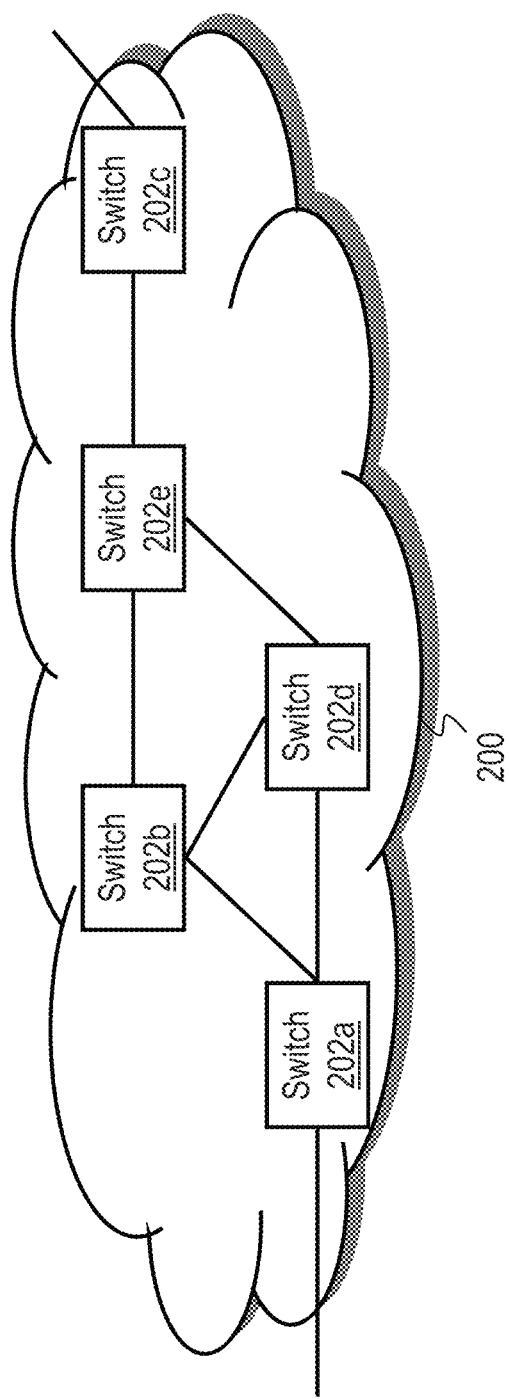
FIG. 2 is a more detailed view of a switching network in the data processing environment of FIG. 1.

Referring now to FIG. 2, there is illustrated a more detailed view of an exemplary embodiment of a switching network 200 within resources 102 of data processing environment 100. Switching network 200 may be, for example, a Transparent Interconnection of Lots of Links (TRILL) network, Ethernet network, Fibre Channel network, a converged network carrying Fibre Channel over Ethernet (FCoE), or some other packet switched network.

As shown, switching network 200 comprises a plurality (and in some cases a multiplicity) of switches 202. In various embodiments, each of switches 202 may be implemented in hardware, in software, or in a combination of hardware and software.

In the present exemplary embodiment, switches 202 of switching network 200 include a first switch 202a that serves as an ingress switch for at least some data traffic of switching network 200, a third switch 202c that serves as an egress switch for at least some data traffic of switching network 200, and intermediate second, fourth and fifth switches 202b, 202d, and 202e, respectively. Thus, in the depicted exemplary switching network 200, data traffic may be forwarded between first switch 202a and third switch 202c via multiple paths, including the first path through second and fifth switches 202b, 202e and the alternative second path through fourth and fifth switches 202d, 202e.

In a switching network 200 such as that illustrated, any of switches 202 may become congested as one or more other switches 202 transmit data traffic to a switch 202 at a rate greater than that switch 202 is itself able to forward that data traffic towards its destination(s). In many switching networks 200, congestion is more frequently experienced at egress switches 200, such as third switch 200c. For example, switch 202c may become congested as switches 202b, 202d and 202e all concentrate egress data traffic at egress switch 202e, which may provide access to a server or other frequently accessed network-connected resource. As noted above, conventional congestion management messaging has been found to be inadequate in at least some circumstances because of the inherent delay in receiving the congestion management messages at network nodes transmitting the congesting data traffic (e.g., switch 202a) and because of the optional adherence of nodes (e.g., switches 202a, 202b, 202d and 202e) to the reduction of data traffic requested by such congestion management messages.

Figure 3:
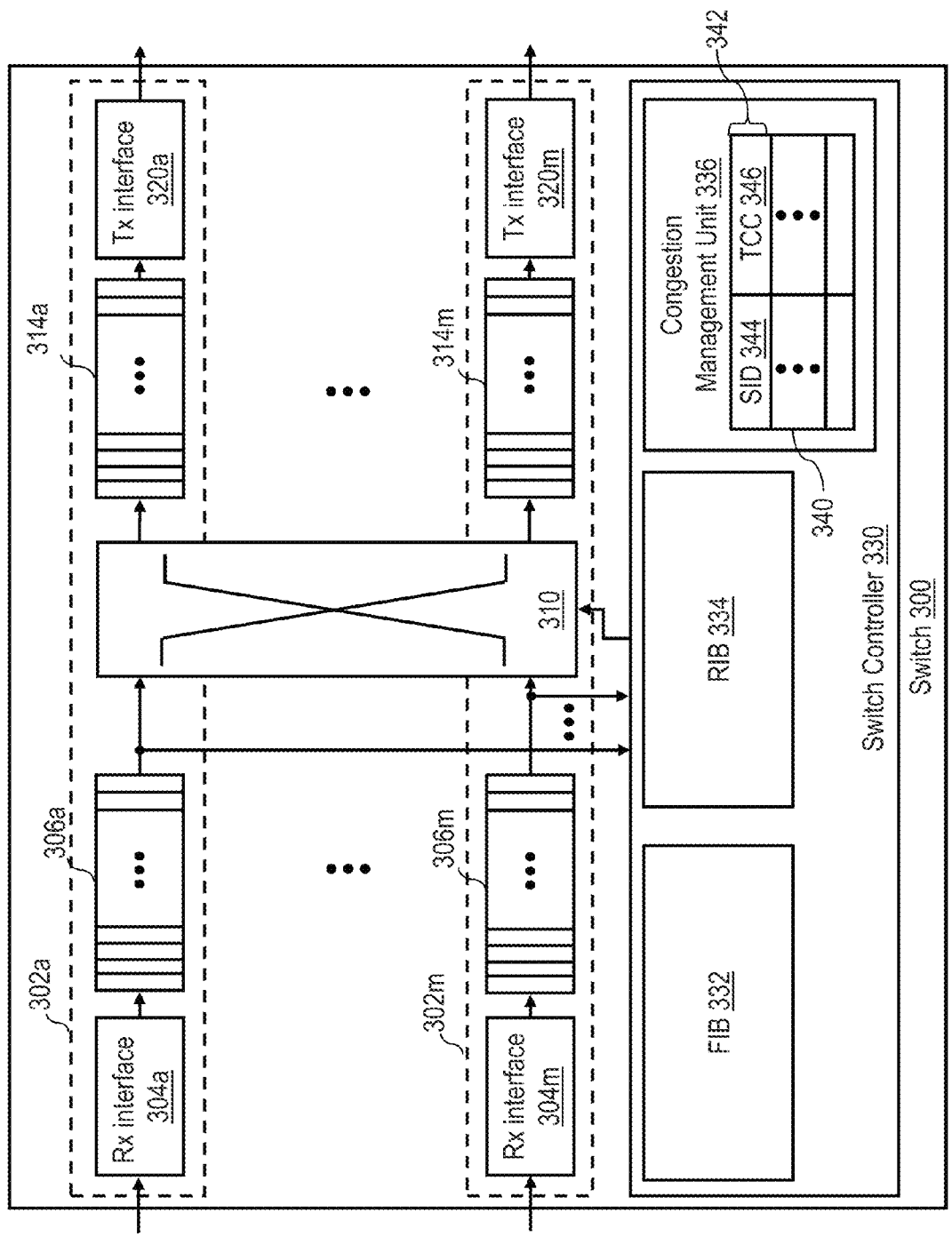
FIG. 3 illustrates an exemplary embodiment of a physical switch in a switching network.

With reference now to FIG. 3, there is illustrated a first exemplary embodiment of a physical switch 300 that may be utilized to implement any of switches 202 of FIG. 2. As shown, switch 300 includes a plurality of physical ports 302a-302m. Each physical port 302 includes a respective one of a plurality of receive (Rx) interfaces 304a-304m and a respective one of a plurality of ingress queues 306a-306m that buffers frames of data traffic received by the associated Rx interface 304. Each of ports 302a-302m further includes a respective one of a plurality of egress queues 314a-314m and a respective one of a plurality of transmit (Tx) interfaces 320a-320m that transmit frames of data traffic from an associated egress queue 314.

Switch 300 additionally includes a crossbar 310 that is operable to intelligently switch data frames from any of ingress queues 306a-306m to any of egress queues 314a-314m under the direction of switch controller 330. As will be appreciated, switch controller 330 can be implemented with one or more centralized or distributed, special-purpose or general-purpose processing elements or logic devices, which may implement control entirely in hardware, or more commonly, through the execution of firmware and/or software by a processing element.

In order to intelligently switch data frames, switch controller 330 builds and maintains one or more data plane data structures, for example, a Layer 2 forwarding information base (FIB) 332 and a Layer 3 routing information base (RIB) 334, which can be implemented, for example, as tables in content-addressable memory (CAM). In some embodiments, the contents of FIB 332 can be preconfigured, for example, by utilizing a management interface to specify particular egress ports 302 for particular traffic classifications (e.g., MAC addresses, traffic types, ingress ports, etc.) of traffic. Switch controller 330 can alternatively or additionally build FIB 332 in an automated manner by learning from observed data frames an association between ports 302 and destination MAC addresses specified by the data frames and recording the learned associations in FIB 332. Switch controller 330 thereafter controls crossbar 310 to switch data frames in accordance with the associations recorded in FIB 332. RIB 334, if present, can similarly be preconfigured or dynamically to route data packets. For example, in a embodiment in which switch 300 is a TRILL switch implemented in a TRILL network, RIB 334 is preferably preconfigured with a predetermined route through switching network 200 among multiple possible equal cost paths for each destination address. In other embodiments, dynamic routing algorithms, such as ECMP or the like, can be utilized to dynamically select (and update RIB 334 with) a route for a flow of data traffic based on Layer 3 address and/or other criteria.

Switch controller 330 additionally implements a congestion management unit 336 that can be utilized to manage congestion (including its prevention) within a switching network 200. In accordance with a preferred embodiment, congestion management unit 336 is configured to request transmission credits from an end node in a flow path through switching network 200. The transmission credits may be denominated, for example, in a quanta of data traffic, such as a count of data frames (Layer 2) or data packets (Layer 3). The transmission credits can additionally have an associated maximum rate of data traffic expressed, for example, as data frames or data packets per time period. Congestion management unit 336 is further configured to regulate transmission of the data traffic by switch 300 along the flow path in accordance with the transmission credits it has received. In addition, congestion management unit 336 is configured to generate transmission credits requested by other switches 300, as well as to modify transmission credits generated by other switches 300 in accordance with the available transmission capabilities and available bandwidth of switch 300. The congestion management implemented by congestion management unit 336 is described in greater detail below with reference to FIGS. 5-7.

In support of the congestion management implemented by congestion management unit 336, congestion management unit 336 preferably implements a data structure, such as transmission credit data structure 340. In the depicted embodiment, transmission credit data structure 340 includes multiple entries 342 each identifying a particular switch 202 in a switch ID (SID) field 344 and associating the identified switch 202 with a count of transmission credits specified by a transmission credit counter (TCC) 346. In response to receipt by switch 300 of transmission credits generated by a particular switch 202, congestion management unit 336 updates the TCC 346 of the relevant entry 342 (or installs a new entry 342) in transmission credit data structure 340. Congestion management unit 336 then diminishes the transmission credits reflected by a given TCC 346 as data traffic is forwarded by switch 300 to the switch 202 associated with that TCC 346. In a preferred embodiment, switch 300 is configured to not forward data traffic to a switch 202 in excess of that for which switch 300 has transmission credits. Although shown separately from FIB 332 and RIB 334 for the sake of clarity, it should be appreciated that in some embodiments, transmission credit data structure 340 can be implemented in combination with one or both of FIB 332 and RIB 334. Further, it should be appreciated that switch controller 330 can install and/or update the forwarding and routing entries in FIB 332 and RIB 334 based on the flow paths for which it has the greatest amount of available transmission credits.

Figure 4:
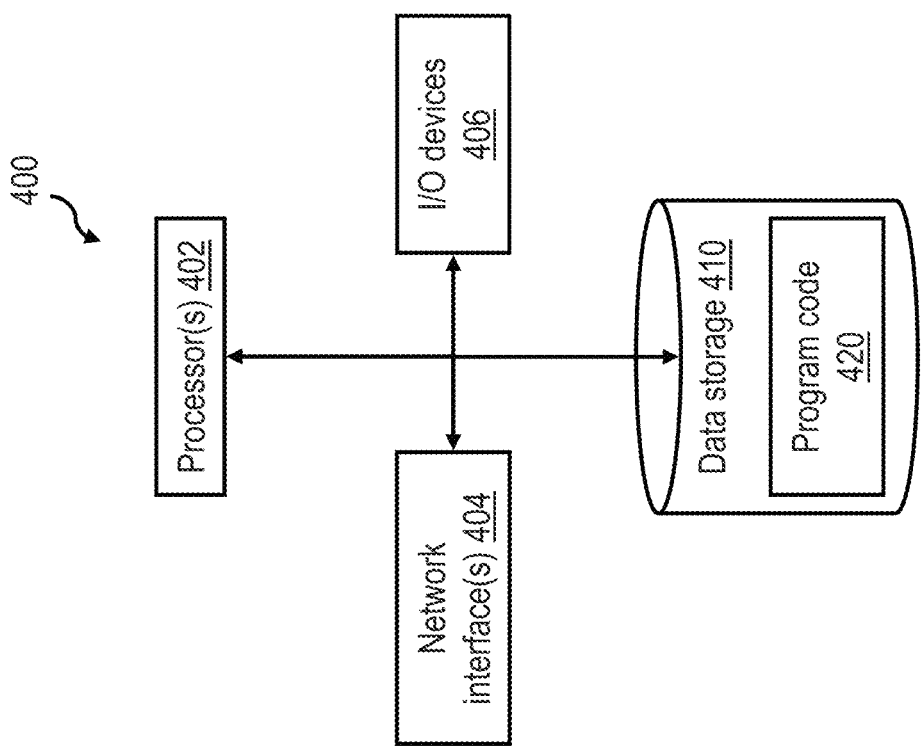
FIG. 4 depicts an exemplary embodiment of a host platform that can be utilized to implement a virtual switch of a switching network.

As noted above, any of switches 202 may be implemented as a virtual switch by program code executed on a physical host platform. For example, FIG. 4 depicts an exemplary host platform 400 including one or more network interfaces 404 (e.g., network interface cards (NICs), converged network adapters (CNAs), etc.) that support connections to physical network links for communication with other switches 202 or other network-connected devices. Host platform 400 additionally includes one or more processors 402 (typically comprising one or more integrated circuits) that process data and program code, for example, to manage, access and manipulate data or software in data processing environment 100. Host platform 400 also includes input/output (I/O) devices 406, such as ports, displays, user input devices and attached devices, etc., which receive inputs and provide outputs of the processing performed by host 400 and/or other resource(s) in data processing environment 100. Finally, host platform 400 includes data storage 410, which may include one or more volatile or non-volatile storage devices, including memories, solid state drives, optical or magnetic disk drives, tape drives, etc. Data storage 410 may store, for example, program code 420 (including software, firmware or a combination thereof) executable by processors 402. Program code 420, which may comprise one or more of a virtual machine monitor (VMM), virtual machines, operating system(s) (OSs), and/or application software, may implement one or more switches 202 (and one or more associated network links) virtually. As understood by those skilled in the art, such virtual switches may virtualize the components and functions of switch 300 of FIG. 3, including that of congestion management unit 336. Further, such switches can be configured to support any of a number of protocols, including TRILL, Fibre Channel, Ethernet, FCoE, etc.

Figure 5:
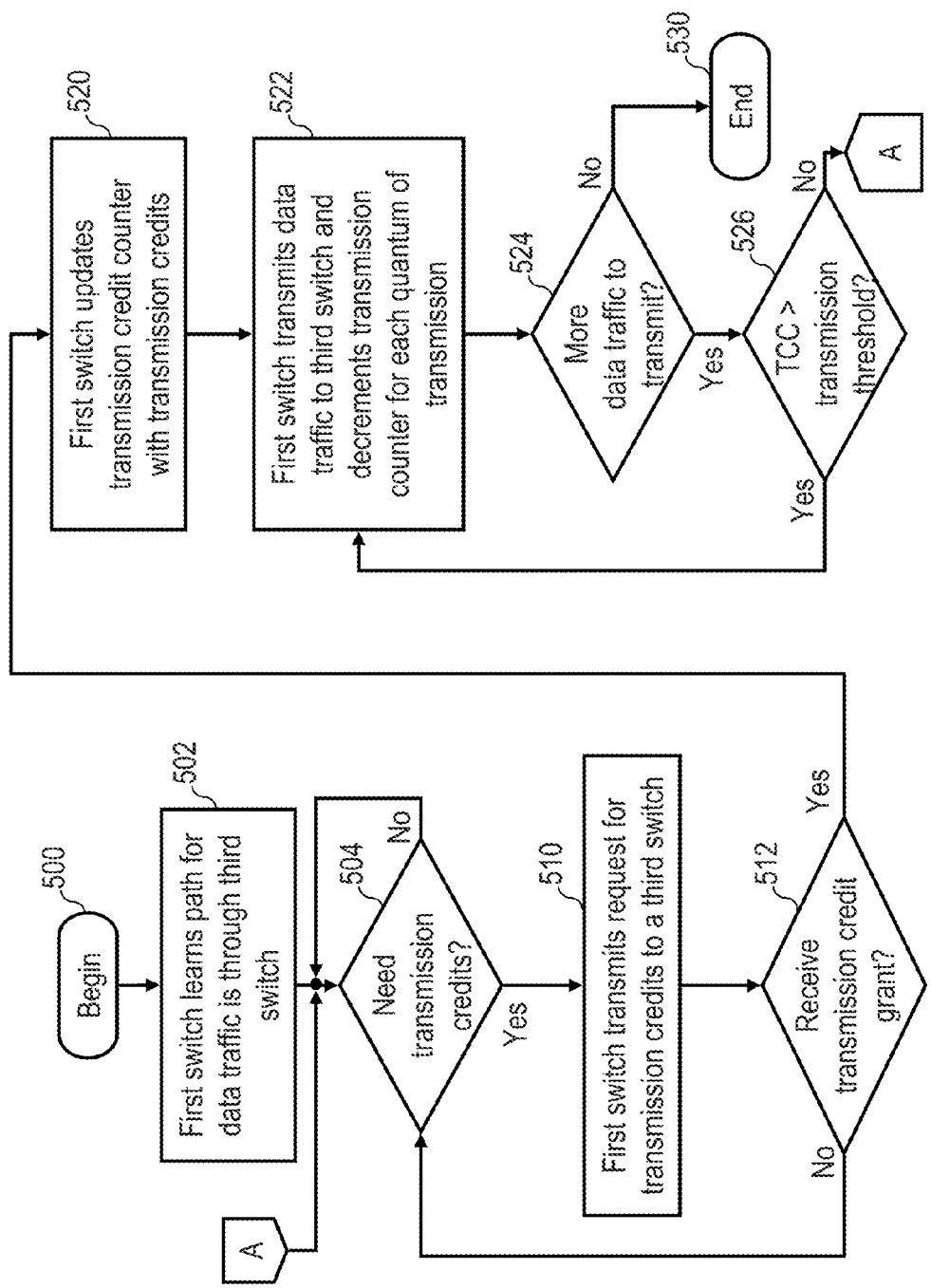
FIG. 5 is a high level logical flowchart of an exemplary embodiment of a process by which a switch transmitting data traffic implements congestion management in a switching network.

With reference now to FIG. 5, there is illustrated a high level logical flowchart of an exemplary embodiment of a process by which a switch transmitting data traffic implements congestion management in a switching network. Like the other logical flowcharts presented herein, FIG. 5 depicts steps of the process in logical rather than strictly chronological order, meaning that at least some steps may be performed in a different order than presented or concurrently. For clarity of exposition, FIG. 5 will be described with reference to the operation of first switch 202a of switching network 200.

The process of FIG. 5 begins at block 500 and then proceeds to block 502, which illustrates first switch 202a of switching network 200 learning that the flow path for data traffic to be forwarded by first switch 202a is through third switch 202e, which is identified as the egress switch in switching network 200 for the traffic flow. The determination illustrated at block 502 can be made, for example, by switch controller 330 determining a flow path for data traffic ingressing into switching network 200 by reference to one or more entries in one or more of FIB 332 and RIB 334. In response to the determination at block 502, congestion management unit 336 of first switch 202a determines at block 504 whether or not additional transmission credits are needed to transmit the data traffic to third switch 202c. In some embodiments, the determination depicted at block 504 may reflect a determination of whether the TCC 346 of the entry 342 of transmission credit data structure 340 associated with the SID of third switch 202c has a count value greater than a transmission threshold. If congestion management unit 336 makes a negative determination at block 504, meaning that first switch 202a has received and retained sufficient transmission credits from third switch 202c to transmit at least a threshold amount of data traffic to third switch 202c, the process iterates at block 504.

In response to a determination at block 504 that switch 202a needs additional transmission credits for switch 202c in order to forward data traffic, the process proceeds to block 510. Block 510 depicts first switch 202a transmitting a request for transmission credits to third switch 202c, meaning that in the embodiment of switching network 200 shown in FIG. 2, the request for transmission credits traverses one or more intermediate switches 202, including second switch 202b, it will be appreciated that in various protocols, the transmission credit request can be communicated out-of-band in a proprietary control frame, out-of-band in a standards-based control frame, or can be "piggy-backed," for example, in an encapsulated header, reserved field, or padding field of an in-band data frame forwarded toward third switch 202c. The request for transmission credits can optionally specify a requested amount of transmission credits.

Next, at block 512, congestion management unit 336 determines whether or not a transmission credit grant for third switch 202e has been received within a timeout period. As with the transmission credit request, the transmission credit grant can be communicated to first switch 202a out-of-band in a proprietary control frame, out-of-band in a standards-based control frame, or can be "piggy-backed" in an in-band data frame. If a transmission credit grant has not been received within the timeout period, the process returns to block 504, which has been described, if however, congestion management unit 336 determines at block 512 that a transmission credit grant has been received, congestion management unit 336 updates the TCC 346 associated with third switch 202e with the received transmission credits (block 520).

With the transmission credits, congestion management unit 336 permits switch 202a to forward data traffic to third switch 202c, which in the embodiment of FIG. 2 entails forwarding data traffic toward third switch 202c via one or more intermediate switches 202, such as second switch 202b (block 522). Until sufficient transmission credits are received, congestion management unit 336 preferably prevents first switch 202a from forwarding data traffic toward third switch 202c, meaning that first switch 202a either temporarily buffers data traffic for forwarding toward third switch 202c in its ingress queues 306 and/or egress queues 314 or simply drops the traffic (e.g., once a buffer limit is reached). As further indicated at block 522, as first switch 202a forwards each quantum of data traffic toward third switch 202c, congestion management unit 336 decrements the relevant TCC 346 for each quantum of data traffic (e.g., data packet or data frame) transmitted by first switch 202a toward third switch 202c.

As indicated at blocks 524 and 526, as long as first switch 202a has more data traffic to forward toward third switch 202c and has sufficient (i.e., more than a transmission threshold amount of) transmission credits to do so, first switch 202a continues to forward data traffic to third switch 202c via one or more intermediate switches, such as second switch 202b, as depicted at block 522. If the data traffic to be forwarded is exhausted prior to the available transmission credits, then the process of FIG. 5 proceeds from block 524 to block 530 and terminates. If, however, the transmission credits of first switch 202a for third switch 202c reach the transmission threshold while additional data traffic remains to be forwarded toward third switch 202c, the process returns to block 504 via page connector A, indicating that first switch 202a requests additional transmission credits from third switch 202c to enable transmission of the additional data traffic. It should be appreciated that in at least some embodiments, first switch 202a can request additional transmission credits from third switch 202c prior to the exhaustion of all transmission credits for third switch 202c and can transmit additional data traffic toward third switch 202c in the interim with any remaining transmission credits until additional transmission credits for third switch 202c are received.

Figure 6:
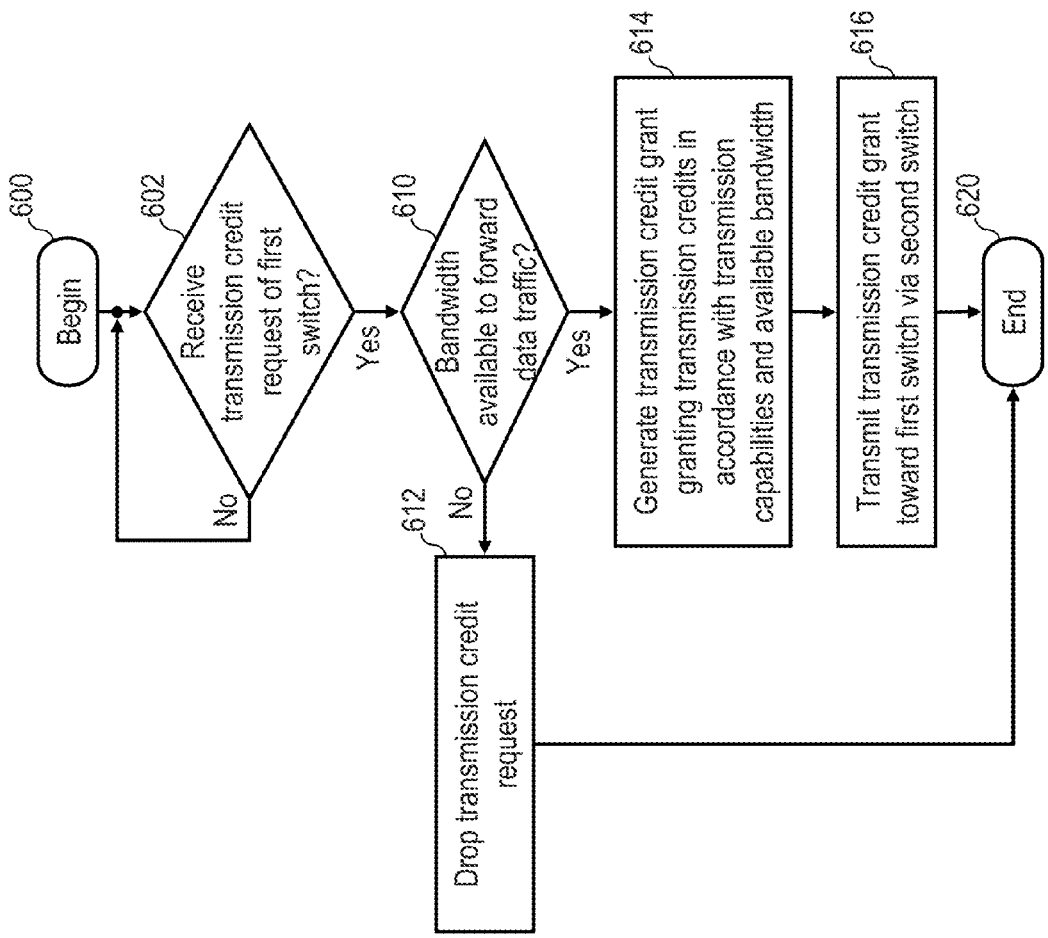
FIG. 6 is a high level logical flowchart of an exemplary embodiment of a process by which a switch receiving data traffic implements congestion management in a switching network.

Referring now to FIG. 6, there is depicted is a high level logical flowchart of an exemplary embodiment of a process by which a switch receiving data traffic implements congestion management in a switching network. For clarity, the process of FIG. 6 will be described with reference to third switch 202c, which serves as an egress switch for at least some data traffic of switching network 200.

The process of FIG. 6 begins at block 600 and then proceeds to block 602, which illustrates third switch 202c monitoring for receipt of a transmission credit request, for example, from first switch 202a. In response to receipt of a transmission credit request from first switch 202a, third switch 202c determines at block 610 whether or not third switch 202c presently has bandwidth available to forward data traffic based on its transmission capabilities and available bandwidth. Third switch 202c may optionally further take into consideration the aggregate number of outstanding transmission credits that it has granted that have not been used. In response to a negative determination at block 610, third switch 202e drops the transmission credit request at block 612. Thereafter, the process of FIG. 6 ends at block 620.

Returning to block 610, in response to third switch 202c determining that its has bandwidth available to forward data traffic, the process proceeds from block 610 to block 614. Block 614 depicts congestion management unit 336 of third switch 202c generating a transmission credit grant specifying an amount of transmission credits in accordance with its transmission capabilities and available bandwidth. Third switch 202c thereafter transmits the transmission credit grant toward first switch 202a via second switch 202b (block 616). The process of FIG. 6 then terminates at block 620.

Figure 7:
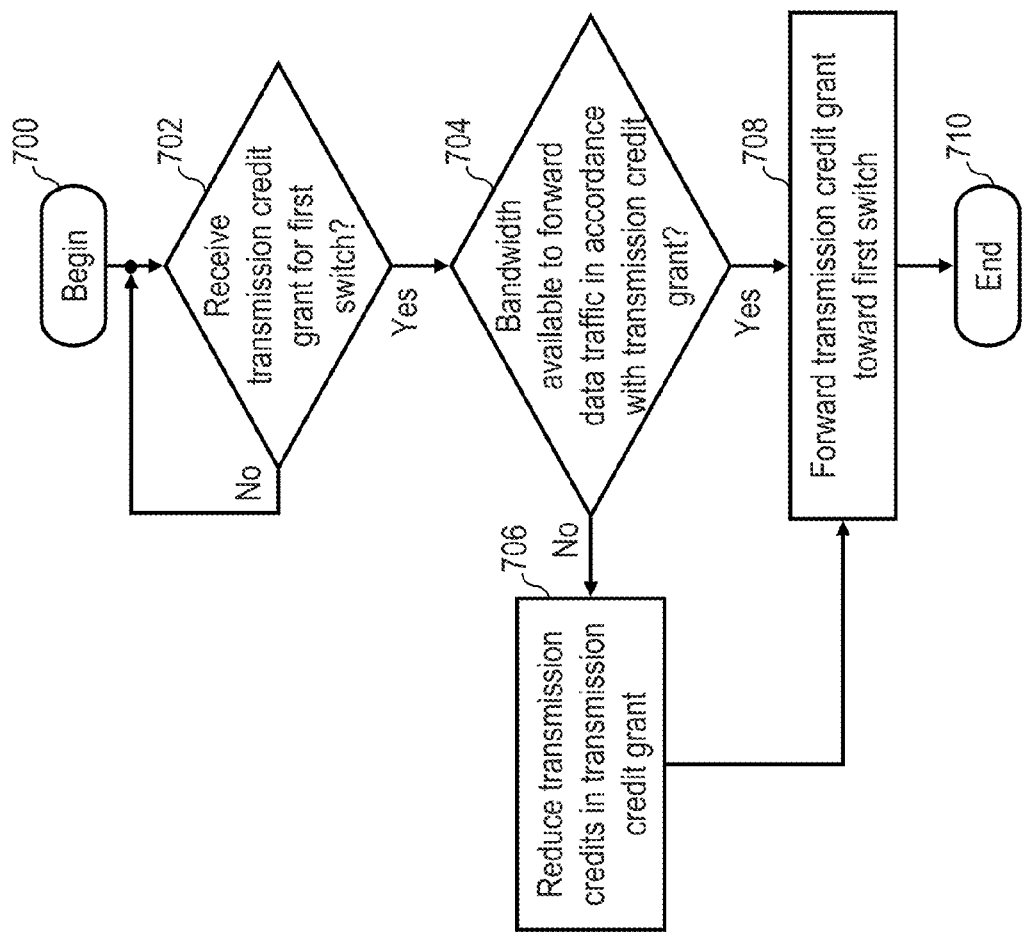
FIG. 7 is a high level logical flowchart of an exemplary embodiment of a process by which an intermediate switch forwarding data traffic implements congestion management in a switching network.

With reference now to FIG. 7, there is illustrated a high level logical flowchart of an exemplary embodiment of a process by which an intermediate switch forwarding data traffic implements congestion management in a switching network. For clarity, the process of FIG. 7 will be described with reference to second switch 202b, which is intermediate an ingress switch (i.e., first switch 202a) and an egress switch (i.e., third switch 202c) for at least some data traffic of switching network 200.

The process of FIG. 7 begins at block 700 and then proceeds to block 702, which illustrates second switch 202b monitoring for receipt of a transmission credit grant of another switch 202, for example, a transmission credit grant by third switch 202c for first switch 202a. In response to receipt from third switch 202e of a transmission credit grant, second switch 202b determines at block 704 whether or not second switch 202b presently has bandwidth available to forward data traffic toward third switch 202c in accordance with the amount of transmission credits specified by the transmission credit grant. As with third switch 202e, second switch 202b may make the evaluation shown at block 704 based on, for example, its transmission capabilities, available bandwidth, and the aggregate number of transmission credits it has granted that have not been used. In response to a negative determination at block 704, congestion management unit 336 of second switch 202b reduces the amount of transmission credits specified in the transmission credit grant request in accordance with its ability to forward data traffic toward third switch 202c (block 706). The process then proceeds to block 708.

Returning to block 704, in response to second switch 202b determining that its has bandwidth available to forward data traffic in accordance with the full amount of transmission credits specified in the transmission credit grant, congestion management unit 336 does not diminish the amount of transmission credits specified in the transmission credit grant. Instead, the process proceeds directly from block 704 to block 708. Block 708 depicts second switch 202b forwarding the transmission credit grant specifying the possibly modified amount of transmission credits toward first switch 202a. The process of FIG. 7 thereafter terminates at block 710. As should be appreciated, as the process of FIG. 7 is repeated at one or more intermediate switches coupled between third switch 202c and first switch 202a as the transmission credit grant traverses the end-to-end flow path of the data traffic, the amount of transmission credits specified in the transmission credit grant may be diminished by one or more of the intermediate switches, reducing (or even eliminating) the likelihood that any of the switches 202 in the end-to-end flow path will subsequently drop data traffic forwarded from first switch 202a to block 202c due to congestion.

As has been described, in at least one embodiment a switching network includes first, second and third switches coupled for communication, such that the first and third switches communicate data traffic via the second switch. The first switch is operable to request transmission credits from the third switch, receive the transmission credits from the third switch and perform transmission of data traffic in reference to the transmission credits. The third switch is operable to receive the request for transmission credits from the first switch, generate the transmission credits and transmit the transmission credits to the first switch via the second switch. The second switch is operable to modify the transmission credits transmitted by the third switch prior to receipt of the transmission credits at the first switch.

While the present invention has been particularly shown as described with reference to one or more preferred embodiments, it will be understood by those skilled in the art that various changes in form and detail may be made therein without departing from the spirit and scope of the invention. For example, although aspects have been described with respect to one or more machines (e.g., hosts and/or network switches) executing program code (e.g., software, firmware or a combination thereof) that direct the functions described herein, it should be understood that embodiments may alternatively be implemented as a program product including a tangible machine-readable storage medium or storage device (e.g., an optical storage medium, memory storage medium, disk storage medium, etc.) storing program code that can be processed by a machine to cause the machine to perform one or more of the described functions.

What is claimed is:

1. A hardware platform, comprising:
a switch for a switching network, wherein the switch is a second switch through which data traffic is communicated between first and third switches of the switching network, wherein the second switch comprises:
a plurality of ports for communicating data traffic; and
a switch controller that controls switching between the plurality of ports, wherein the switch controller is configured, responsive to receiving from the third switch transmission credits intended for the first switch, the transmission credits specifying a quanta of network traffic that can be transmitted by the first switch, to modify the transmission credits and transmit the modified transmission credits to the first switch.

2. The hardware platform switch of claim 1, wherein the transmission credits indicate an authorized number of Layer 2 data frames that are permitted to be transmitted.

3. The hardware platform of claim 1, wherein the second switch reduces the transmission credits in accordance with its available bandwidth.

4. A switching network comprising:
a hardware platform in accordance with claim 1;
the first and third switches coupled to the second switch for communication of data traffic there through;
wherein the first switch is configured to request transmission credits from the third switch, receive the transmission credits from the third switch and transmit data traffic in accordance with the transmission credits;
wherein the third switch is configured to receive a request for transmission credits from the first switch, generate the transmission credits and transmit the transmission credits toward the first switch via the second switch.

5. The switching network of claim 4, wherein:
the first switch comprises an ingress switch; and
the third switch comprises an egress switch.

6. The switching network of claim 5, wherein the switching network comprises a Transparent Interconnection of Lots of Links (TRILL) network.

7. The switching network of claim 6, wherein:
the TRILL network includes a fourth switch coupled between the first and third switches; and
the first switch selects a transmission path to the third switch via the second switch rather than the fourth switch based on the transmission credits available through the second switch.

8. The switching network of claim 4, wherein the first switch decrements transmission credits received from the third switch in accordance with its transmission of data traffic to the third switch.

9. The switching network of claim 4, wherein the third switch generates the transmission credits in accordance with its available bandwidth.

10. A program product, comprising:
a machine-readable storage device; and
program code stored within the machine-readable storage device for operating a switching network including first and third switches coupled to the second switch to communicate data traffic there through, wherein the program code, when processed by a machine, causes the machine to perform:
the second switch receiving from the third switch transmission credits intended for the first switch, the transmission credits specifying a quanta of network traffic that can be transmitted by the first switch; and
responsive to receiving the transmission credits, the second switch modifying the transmission credits and transmitting the modified transmission credits to the first switch.

11. The program product of claim 10, wherein the transmission credits indicate an authorized number of Layer 2 data frames that are permitted to be transmitted.

12. The program product of claim 10, wherein the modifying includes the second switch reducing the transmission credits in accordance with its available bandwidth.

13. The program product of claim 10, wherein the program product further causes performance of:
the first switch requesting transmission credits from a third switch, and in response to receiving transmission credits, transmitting data traffic in accordance with the transmission credits;
the third switch receiving a request for transmission credits from the first switch, generating the transmission credits, and transmitting the transmission credits toward the first switch via the second switch.

14. The program product of claim 10, wherein:
the first switch comprises an ingress switch;
the third switch comprises an egress switch; and
the program code further causes the ingress switch to transmit data traffic across the switching network to the egress switch in accordance with the transmission credits.

15. The program product of claim 14, wherein the switching network comprises a Transparent Interconnection of Lots of Links (TRILL) network.

16. The program product of claim 15, wherein:
the TRILL network includes a fourth switch coupled between the first and third switches; and the program code further causes the first switch to select a transmission path to the third switch via the second switch rather than the fourth switch based on the transmission credits available through the second switch.

17. The program product of claim 14, wherein the program code further causes the first switch to decrement the received transmission credits in accordance with its transmission of data traffic to the third switch.

18. The program product of claim 14, wherein the program code further causes the third switch to generate the transmission credits in accordance with its available bandwidth.

\* \* \* \* \*